Sept. 29, 1964 V. E. VAN SKYOCK 3,150,881
COMBINATION GOLF BAG AND CART
Filed May 2, 1963 2 Sheets-Sheet 1

INVENTOR.
VAUGHN E. VANSKYOCK
BY
Toulmin & Toulmin
ATTORNEYS

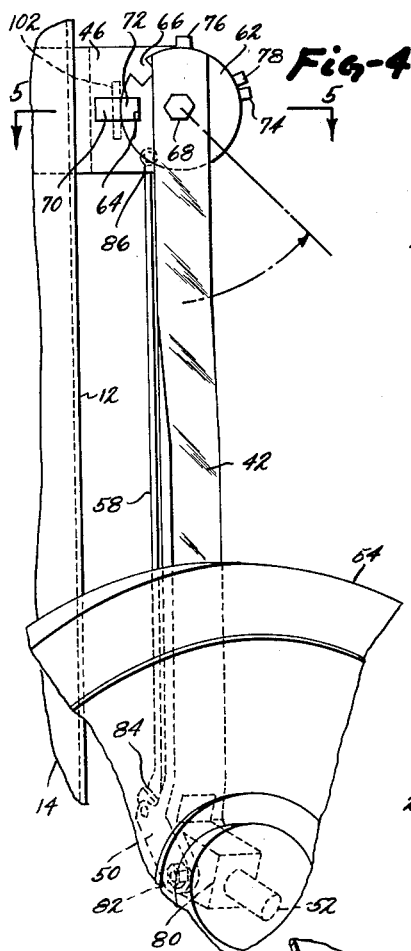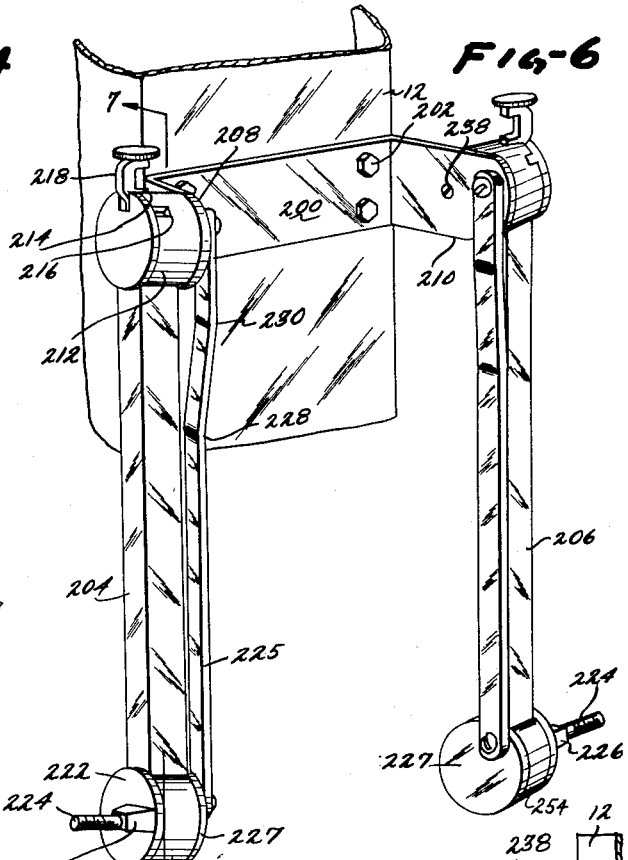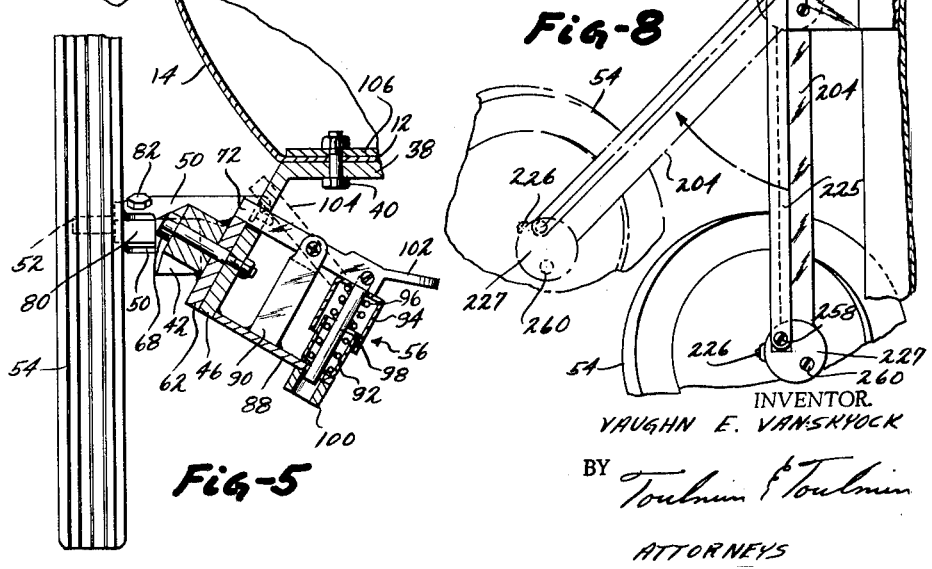

United States Patent Office 3,150,881
Patented Sept. 29, 1964

3,150,881
COMBINATION GOLF BAG AND CART
Vaughn E. Van Skyock, Rte. 1, Palmer Road,
New Carlisle, Ohio
Filed May 2, 1963, Ser. No. 277,528
9 Claims. (Cl. 280—41)

This invention relates to a combination golf bag and cart which forms a complete unit to handle a golfer's playing needs while golfing.

This invention provides a lightweight bag and cart combination which is attractive in appearance, compact, rugged in construction, lightweight, and because it is made of metal, such as aluminum, it is of lasting durability. It can be painted a variety of attractive colors or be anodized as desired.

Prior combinations involve structures that are either complex and costly, or of elaborate construction which structurally fail when the cart is extensively used on hilly or bumpy golf courses.

The preferred embodiment of this invention utilizes a rugged bracket which is fixed to a rigid end panel forming a part of the golf bag itself. The wheel supporting legs are pivotally mounted on the bracket and held in the collapsed and extended positions by a simple rugged latch structure. The wheels are kept in parallel relationship to each other by a unique simplified structure having rugged legs and one axle orienting strut for each leg.

A first modification of this invention incorporates this simplicity of design and while it is somewhat similar to the cart shown in the patent to Williamson 2,885,215, which issued May 5, 1959, it is of much simpler construction. For example, there is no intricate machining required in applicant's device to form camming surfaces to lock applicant's cart in the extended position.

Applicant's devices are of rugged, simple design. The rigid bag and cart structure combine to make a bag and cart combination which can be sold as one unit to satisfy a golfer's playing needs.

A primary object of this invention is to provide a rigid lightweight bag and cart combination which is attractive in appearance, compact, economical to produce, rugged in construction, and of lasting durability.

A further object of this invention is to provide a cart structure of rugged, simple design which will maintain the wheels in parallel relationship when the legs are folded against the bag and in the extended position.

While the structure herewith disclosed has been made out of welded aluminum principally, it is understood that other metals such as steel could be used, and while the elements are principally disclosed as weldments, they of course could be made as castings wherever possible.

Further objects and advantages will become apparent from the following description and accompanying drawings wherein like numbers designate like parts and in which:

FIGURE 4 is a view taken along the general lines 4—4 of FIGURE 3 showing the latch and axle means of the cart;

FIGURE 5 is a view taken along the lines 5—5 of FIGURE 4 showing the structure of the latch means;

FIGURE 6 is a perspective view of the cart structure of a modification of the preferred embodiment;

FIGURE 8 is a side view of a modification of this invention showing the path of the wheels in traveling from a folded to an extended position.

Figure 1:
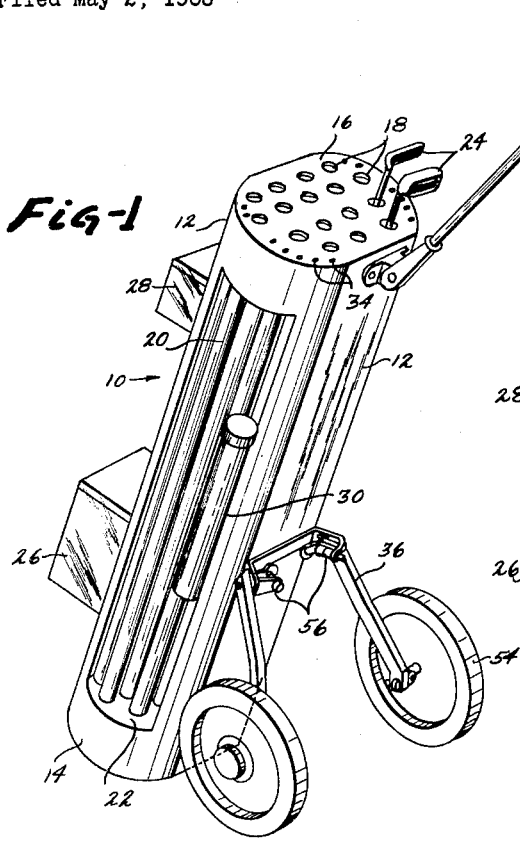
FIGURE 1 is a perspective view of a preferred embodiment of this invention.

Referring more in detail to the drawings, FIGURE 1 is a perspective view of the preferred embodiment of this invention. It shows a rigid golf bag 10 made out of aluminum or other light weight material having end panels 12 and curved panels 14 which are suitably joined as by welding to produce a neat rigid bag.

At the top of the bag there is a spacer 16 which is made out of sheet aluminum and welded to sides 12 and 14 to present a flush appearance as shown. This spacer 16 has a series of holes 18 into which plastic tubes 20 of known variety are inserted. A matching lower spacer 22 keeps the tubes in an aligned position in the bag. Additional similar spacers (not shown) are placed between the lower and upper spacers where necessary. The holes 18 are staggered to permit the club heads 24 to nestle and thereby minimize damage to them when the clubs are placed in the plastic tubes 20. A suitable cushion member (not shown) can be placed on the bottom of the bag to cushion the fall of the handle of the club as it is dropped in the plastic tube.

When a club is withdrawn from tube 20 there is a tendency, at times, for the tube to be partially withdrawn with the club. The lower spacer 22 is appropriately positioned about 4 inches above the bottom of the bag to maintain the tube 20 in the spacer 22 should the tube be partially withdrawn. A simple tap will then push the tube back into position.

The bag is suitably supplied with a miscellaneous compartment 26, ball compartment 28, an umbrella compartment 30, and a handle 32 of known variety which is suitably fastened to end panel 12. A number of smaller holes 34 are drilled in spacer 16 to provide a storage place for tees which are frictionally retained in the holes.

The cart structure generally designated 36, which forms a part of this invention, is suitably fastened to end panel 12. The rigid bag 10 and the simplified cart construction 36 combine to form a rugged, attractive cart and bag combination of lasting durability.

Figure 2:
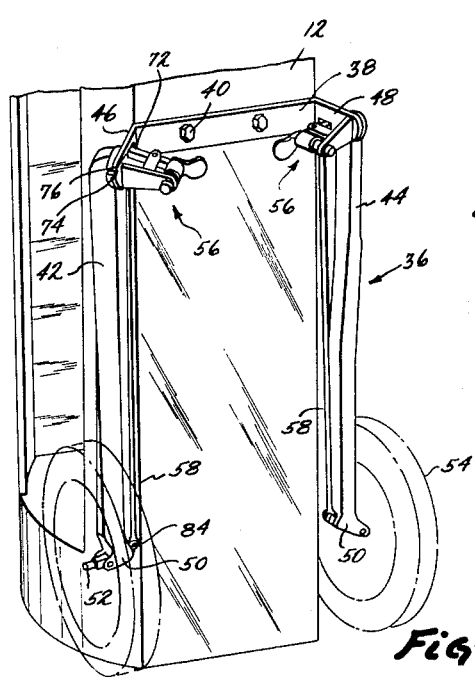
FIGURE 2 is a perspective view of the preferred embodiment of this invention showing a closeup of the cart structure in a folded position against the rigid bag.

FIGURE 2 shows a closeup of the cart structure of this invention. It consists of a generally U-shaped support member 38 which is fastened to end panel 12 by fasteners 40.

Legs or links 42 and 44 are made of rectangular tubular stock, which are pivotally mounted on arms 46 and 48, respectively, of support member 38. On the lower ends of the legs are side plates 50 which straddle wheel axles 52. The legs are slightly twisted as shown and this twisting aspect will be described in relation to the description of the wheel axles. Leg 44 is a mirror image of leg 42, therefore only leg 42 will be discussed in detail.

The standard wheels 54 shown by dot-dash outline in FIGURE 2 are in parallel relationship to each other when in the collapsed position and when in the extended position for normal use shown in FIGURE 1. The cart can therefore be pulled with the wheels in either position.

Also shown in FIGURE 2 are latch means 56 for locking the wheels in the collapsed and extended positions and struts 58 which will be described in detailed hereinafter.

Figure 3:
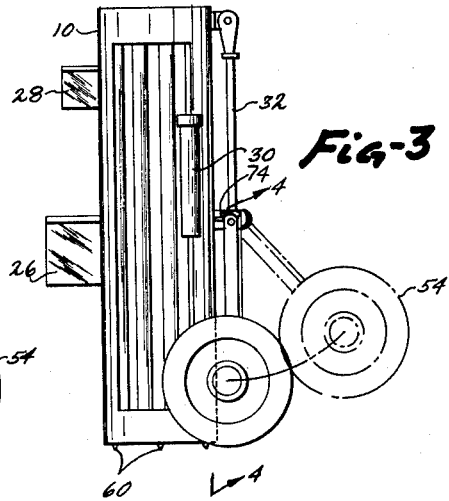
FIGURE 3 is a side view of the preferred embodiment of this invention showing the cart wheels in a folded position against the rigid bag and also showing, by dot-dash lines, the path of the wheels going into extended position.

FIGURE 3 shows the extent of travel of the wheels from the collapsed to the extended position. On the bottom of the bag, there are cleats 60 of the type found on golf shoes which keep the cart from rolling when in use on a hilly golf course.

FIGURE 4 shows the latch means with the legs in locked position against the cart. The wheel leg 42 is welded on to circular plate 62 which has square notches 64 and 66 on its periphery. The plate 62 is rotatably fastened on to the U-bracket arm 46 by the bolt and nut 68.

The bracket arm 46 has a slot 70 in which latch lever 72 laterally moves. FIGURE 4 shows the lever 72 in notch 64 of plate 62, locking the legs in position against the bag. When the legs are in the extended position, lever 72 is locked in notch 66.

To control the amount of rotation of the legs, while facilitating alignment of notches 64 and 66 with slot 70, there are stops 74 and 76 which are welded on bracket arm 46. A small bar 78 is welded to circular plate 62 and extends over the periphery of bracket arm 46 as shown in FIGURE 2. When bar 78 rotates with plate 62 and abuts against stops 76 or 74 notches 64 or 66, respectively, are aligned with slot 70 to permit bar 72 to readily be urged into locking position.

On the lower end of leg 42 there are welded two side plates 50 which straddle axle bar 80. Axle bar 80 is pivotally mounted between these plates by fastener 82 to enable the wheels 54 to assume a parallel relationship to each other when the legs 42 and 44 are in the collapsed and extended positions.

Axle orienting strut 58 has an "eye bolt" construction on the lower end 84 which is rotatably mounted on the inner end of axle bar 80. The upper end 86 of struct 58 is rotatably mounted and suitably retained on bracket arm 46. As the leg 42 is rotated from the position shown in FIGURE 4 to the extended position shown in FIGURE 3, the inner end bar axle 80 moves upwardly towards leg 42 to maintain the wheels in parallel relationship to each other during the entire rotation of the leg 42. Wheel 54 abuts against the face of axle bar 80 and is suitably retained on axle 52.

The latch mechanism generally designated 56 is shown in FIGURE 5. It consists of a support member 88 which is welded to bracket arm 46 as shown with pivot support 90 being welded to support 88. Lever 72 is suitably pivotally mounted on pivot support 90 as shown.

The spring loading of lever 72 is accomplished by having small cup 92 slide into large cup 94 and contain spring 96 as shown. There are suitable holes drilled in the cups 94 and 92 to permit pin 98 to pass therethrough and keep the cups in alignment.

Pin 98 is pivotally mounted in lever 72 on one end and the other end is inserted in a hole in support member 88 to make a sliding fit. There is a collar 100 which is welded to member 88 as shown with the hole of the collar in alignment with the hole in support member 88.

When it is desired to unlock lever 72 from its locked position the thumb of the right hand is placed on collar 100 and the index finger is placed on grip area 102 of lever 72 and the grip area 102 is squeezed and moved towards collar 100. Collar 100 thereby permits pin 98 to advance without hitting the thumb. With the lever in the dotted position shown at 104, leg 42 may be rotated to the selected position.

U-shaped bracket 38 is shown fastened to bag end wall 12 and reinforcing plate 106 by fastener 40 as shown in FIGURE 5.

FIGURE 5 also shows how leg 42 is twisted and how side panels 50 are angled towards the bag when the wheels are in the collapsed position. When the wheels are extended in the position shown in FIGURE 1, side plates 50 are vertical. The twisting of the legs in conjunction with the angle of fixing side plates 50 enable the wheel axles 52 to be parallel to the plane formed by end panel 12 and also parallel to the ground.

FIGURE 6 shows a modification of the preferred embodiment of this invention. It consists of a generally U-shaped bracket 200 which is fastened to end panel 12 of bag 10 by fasteners 202.

Legs 204 and 206 are rotatably mounted on bracket arms 208 and 210, respectively. Legs 204 and 206 are similarly constructed except leg 206 is a mirror image of leg 204, therefore, only a discussion of leg 204 will follow.

Leg 204 is made of a square tubular rod on the top of which is welded a cylindrical section 212. There are notches 214 and 216 cut into the periphery of section 212 into which spring-urged lever 218 slides to lock the leg 204 in the collapsed and extended positions, respectively.

On the bottom of leg 204 there is welded a second cylindrical section 254 into which cylindrical axle member 222 is rotatably mounted.

A standard wheel axle 224 is formed on section 226 which is welded on to axle member generally designated 222. The axle 224 is positioned on axle member 222 at such an angle so as to make the axle 224 parallel to the ground and parallel to the plane of end section 12 of the bag when both end section 12 and leg 204 are perpendicular to the ground.

Strut 225 is pivotally joined to bracket arm 208 at its upper end and to plate 227 at its lower end. Strut 225 has two bends 228 and 230 as shown which make the upper and lower ends offset but parallel to each other.

The purpose of strut 225 is to keep axle 224 parallel to end panel 12 and parallel to the ground as leg 204 is rotated from the position shown in FIGURE 5 to the extended position shown by the dot-dash lines in FIGURE 8. Since the axle 224 for leg 206 is similarly maintained, the wheels (not shown) mounted on these axles will be parallel to each other when the legs are both in the collapsed or extended positions.

Figure 7:
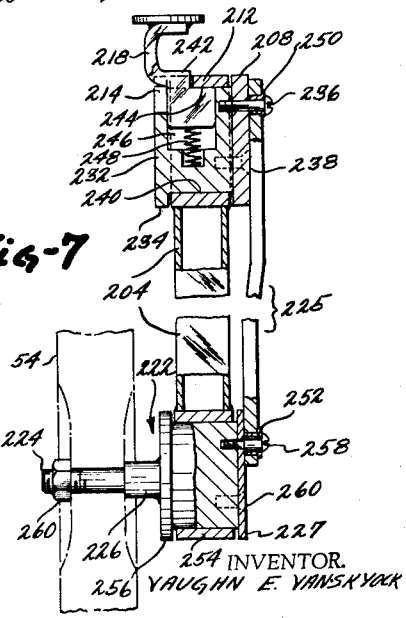
FIGURE 7 is a view of a modification of this invention taken along lines 7—7 of FIGURE 6 showing the latch and axle means.

FIGURE 7 shows the details of the latch mechanism and of the axle means. The latch mechanism comprises a flanged cylindrical insert 232 which fits inside cylinder section 212. The insert 232 has a flange 234.

Insert 232 is suitably anchored to bracket arm 208 by machine screw 236 and flat head machine screw 238 which is fit into a countersunk hole in 208 as shown. There is sufficient clearance between flange 234 and bracket arm 208 to permit cylindrical section 212 to freely rotate on the cylindrical surface 240 of flanged insert 232.

Latch lever 218 is made out of flat bar stock about ¼ inch thick and is shaped as shown in FIGURE 7. The lever has an upper portion 242 which fits into notches 214 or 216 as desired. Shoulder 244 on the lever restrains the lever in position by engaging the inside diameter of cylindrical section 212 as shown. The lever slides up and down in a slot 246 in the center of the flanged insert 232 and is urged upwardly by spring 248 which is suitably mounted in the slot.

To change the position of leg 204, lever 218 is depressed sufficiently far in slot 246 to permit shoulder 242 to go below the inner surface of cylindrical section 212. Leg 204 can then be rotated to the extended position and if lever 218 is left free, it will pop up into notch 216 shown in FIGURE 6 thereby locking the leg in the extended position. The upper portion 242 is chamfered to readily permit it to pop into position.

Strut 225 has a hole drilled in the upper end in which a loosely fitting bushing 250 with flange is inserted. Machine screw 236 loosely fits inside the bushing as shown in FIGURE 7 and draws the flanged insert 232 and the bushing 242 tightly against bracket arm 208. Strut 225 can therefore rotate freely at its upper end on bushing 250. The lower end of strut 225 is rotatably mounted about bushing 252 in a construction similar to that mentioned for mounting the upper end.

Leg 204 is welded to cylindrical section 254 and axle member 222 fits inside section 254 as shown with flange 256 retaining the members on one side. Retaining plate 227 holds axle member 222 on the other side of section 254 by machine screw 258 and flat head machine screw 260. There is sufficient clearance between flanges 256 and 227 to permit axle members 222 to freely rotate.

There are grease grooves (not shown) around the periphery of the surfaces coming in contact with the inside diameter of sections 212 and 254 in which lubricating grease can be placed. Nut 260 keeps wheel 54 on axle 224.

FIGURE 8 shows the extent of travel of leg 204 in traveling from the collapsed to the extended position. By positioning the machine screws 236 and 252 as shown, pivoted points are obtained for strut 225 which enable it to keep axle 224 parallel to the plane of end panel 12 during the entire extent of this travel. By so doing, wheels 54 will be in parallel relationship to each other at all times.

While the cart structure of this invention is shown in connection with a golf bag, it is obvious that the structure could be used in a dolly having a collapsible wheel structure for storage. A simple plate section (not shown) could be welded at a right angle to a panel similar to 12 to form the usual L-shaped dolly structure. This structure could also be used to make a golf cart alone by suitably attaching golf bag retaining straps of known variety on the bottom and top of a panel equivalent to panel 12 of the present invention.

It will be understood that this invention is susceptible to modification in order to adapt it to different usages and conditions and accordingly, it is desired to comprehend such modifications within this invention as may fall within the scope of the appended claims.

What is claimed is:

1. A combination container and cart comprising; a container having a rigid end wall, a handle attached to said wall, and a cart structure attached to said wall; said cart structure comprising: a generally U-shaped bracket fastened to said wall and having two arm sections, one leg pivotally mounted on each said arm section to rotate between a first position adjacent to said wall and a second extended position for normal use of the cart, latching means to lock said legs in said first and second positions and to prevent rotation thereof, axle means movably mounted on the lower ends of said legs parallel to the plane of said wall, wheels rotatably mounted on said axle means, an axle orientating strut for each leg, said strut having an upper end pivotally mounted on said arm section and a lower end pivotally mounted on said axle means to move said axle means to maintain said wheels in parallel relationship to each other when said legs are in said first and second positions.

2. A golf cart for attaching to a golf bag having a rigid end wall, said cart comprising; a generally U-shaped support member for fastening to said wall, said member having two outwardly diverging arm sections, a pair of supporting legs, each leg having an upper end with notches therein and a lower end, one leg pivotally mounted at its said upper end on each said arm section to rotate between a first position adjacent to said wall and a second extended position for normal use of the cart, latching means mounted on said arm sections to engage said notches on said upper ends of said legs to lock said legs in said first and second positions and to prevent rotation thereof, axle means movably mounted on the lower end of each said leg and having a wheel axle parallel to the plane of said wall, a wheel rotatably mounted on each said wheel axle, and an axle orienting strut for each axle means having an upper end pivotally mounted on the respective said arm section and a lower end pivotally mounted on said axle means to move said axle means to maintain said wheel axles in parallel relationship with said rigid end wall when said legs are in said first and second positions.

3. A combination golf bag and cart comprising; a golf bag having a rigid end wall and a handle and cart structure attached thereto, said cart structure comprising a generally U-shaped support member removably fastened to said wall, said member having two outwardly diverging arm sections, a pair of supporting legs, each leg having an upper end with notches therein and a lower end having side plates for straddling an axle, one leg pivotally mounted at its said upper end on each said arm section, latching means mounted on said arm sections to engage said notches on said upper ends of said legs to lock said legs and prevent rotation thereof, axle means for each leg comprising an inner and outer end, a wheel axle on said outer end, said axle means being pivotally mounted between said side plates at approximately its midpoint, a wheel rotatably retained on each said wheel axle, and an axle orienting strut for each axle means having an upper end pivotally mounted on the respective said arm section and a lower end pivotally mounted on the said inner end of the respective axle means for maintaining said wheel axles in parallel relationship with said rigid end wall.

4. A cart structure for use with a golf bag having a rigid end wall, said cart structure comprising; a generally U-shaped support member for fastening to said wall, said member having two outwardly diverging arm sections, a pair of supporting legs, each leg having an upper end with notches therein and a lower end having side plates for straddling an axle, movable axle means for each leg having an inner end and outer end, latching means mounted on said arm sections to engage said notches on said upper ends of said legs to lock said legs and prevent rotation thereof, a wheel rotatably retained on each said axle means, and an axle orienting strut for each said axle means having an upper end pivotally mounted on the respective said arm section and a lower end pivotally mounted on the said inner end of the respective said axle means for maintaining said wheel axles in parallel relationship with said rigid end wall.

5. The cart structure as claimed in claim 4 in which each said arm section has a slot therein and said latching means comprising a latching lever pivotally mounted on each said arm section, said lever passing through said strut for engaging said notches for locking said legs at various angles with said wall, spring means to urge said levers in said notches, said legs being slightly twisted towards the center of said support member, and said side plates being approximately vertical when said legs are in the extended position to maintain said wheels in a parallel relationship to each other.

6. A combination golf bag and cart comprising; a golf bag having a rigid end wall and a handle and cart structure attached thereto, said cart structure comprising a generally U-shaped support member removably fastened to said wall, said member having two outwardly diverging arm sections, first axle means mounted on each of said arm sections, a pair of support legs, each leg having an upper end and a lower end, a cylindrical section having notches therein formed on the upper end of each said leg, said cylindrical section rotatably mounted on said first axle means, the lower end of each leg having a second cylindrical section thereon, second movable axle means for each leg having inner and outer ends, said inner end being rotatably retained in said cylindrical section, a wheel axle formed on each said outer end and being parallel to said wall, a wheel rotatably mounted on each said wheel axle, an axle orienting strut for each second axle means having an upper end pivotally mounted on the respective said arm section and a lower end pivotally mounted on the said inner end of said second axle means for keeping said wheels in parallel relationship to each other, and latching means mounted on said arm sections to engage said notches on said first cylindrical sections to lock said legs to prevent rotation thereof.

7. A cart structure for use with a golf bag having a rigid end wall, said cart structure comprising; a generally U-shaped support member for fastening to said wall, said member having two outwardly diverging arm sections, a pair of support legs, each leg having an upper end and a lower end, a cylindrical section having notches therein formed on the upper end of each said leg, said cylindrical sections rotatably mounted on said first axle means, the lower end of each leg having a second cylindrical section thereon, second axle means for each leg having inner and outer ends, and said inner end being rotatably retained in said second cylindrical section, a wheel axle formed on said outer end being parallel to said wall and parallel to a plane at right angles to said wall, a wheel rotatably mounted on each said wheel axle, an axle orienting strut for each second axle means having an upper end pivotally mounted on the respective said arm section and a lower end pivotally mounted on the said inner end of said second axle means for keeping said wheels in parallel relationship to each other, and latching means mounted on said arm sections to engage said notches on said first cylindrical sections to lock said legs to prevent rotation thereof.

8. A cart structure having a rigid frame, a generally U-shaped support member fastened to said frame, said member having two outwardly diverging arm sections, a pair of supporting legs, each leg having an upper end with notches therein and a lower end having side plates for straddling an axle, movable axle means for each leg having an inner end and outer end, latching means mounted on said arm sections to engage said notches on said upper ends of said legs to lock said legs and prevent rotation thereof, a wheel rotatably retained on each said axle means, and an axle orienting strut for each said axle means having an upper end pivotally mounted on the respective same arm section and a lower end pivotally mounted on the said inner end of the respective said axle means for maintaining said wheel axles in parallel relationship with said rigid end frame.

9. A cart structure having a rigid frame, a generally U-shaped support member fastened to said frame, said member having two outwardly diverging arm sections, a pair of support legs, each leg having an upper end and a lower end, a cylindrical section having notches therein formed on the upper end of each said leg, said cylindrical sections rotatably mounted on said first axle means, the lower end of each leg having a second cylindrical section thereon, second axle means for each leg having inner and outer ends, and said inner end being rotatably retained in said second cylindrical section, a wheel axle formed on said outer end being parallel to said frame and parallel to a plane at right angles to said frame, a wheel rotatably mounted on each said wheel axle, an axle orienting strut for each second axle means having an upper end pivotally mounted on the respective same arm section and a lower end pivotally mounted on the said inner end of said second axle means for keeping said wheels in parallel relationship to each other, and latching means mounted on said arm sections to engage said notches on said first cylindrical sections to lock said legs to prevent rotation thereof.

References Cited in the file of this patent
UNITED STATES PATENTS

| | | |
|---|---|---|
| 2,538,374 | May | Jan. 16, 1951 |
| 2,885,215 | Williamson | May 5, 1959 |
| 2,921,797 | Berglund et al. | Jan. 19, 1960 |